(12) United States Patent
Horita et al.

(10) Patent No.: US 6,183,896 B1
(45) Date of Patent: Feb. 6, 2001

(54) SOLID OXIDE FUEL CELL AND A CARBON DIRECT-OXIDIZING-TYPE ELECTRODE FOR THE FUEL CELL

(75) Inventors: Teruhisa Horita; Natsuko Sakai; Tatsuya Kawada; Harumi Yokokawa, all of Tsukuba; Masayuki Dokiya, Tsuchiura, all of (JP)

(73) Assignee: Agency of Industrial Science and Technology, Tokyo (JP)

( * ) Notice: Under 35 U.S.C. 154(b), the term of this patent shall be extended for 0 days.

(21) Appl. No.: 08/978,143

(22) Filed: Nov. 25, 1997

Related U.S. Application Data

(63) Continuation-in-part of application No. 08/535,728, filed on Sep. 28, 1995, now abandoned, which is a continuation-in-part of application No. 08/216,335, filed on Mar. 23, 1994, now abandoned.

(30) Foreign Application Priority Data

May 11, 1993 (JP) ................................................ 5-132953

(51) Int. Cl.⁷ ............................. H01M 8/06; H01M 8/12
(52) U.S. Cl. ............................................. 429/30; 429/19
(58) Field of Search .................................. 423/439, 440; 429/30, 19

(56) References Cited

U.S. PATENT DOCUMENTS

| | | | |
|---|---|---|---|
| 3,346,421 | * 10/1967 | Thompson | 429/42 |
| 3,380,856 | 4/1968 | Pohl et al. . | |
| 3,756,860 | * 9/1973 | Binder et al. | 429/42 |
| 3,891,512 | * 6/1975 | Jackson | 204/1 T |
| 4,259,414 | 3/1981 | Williams . | |
| 4,288,506 | * 9/1981 | Coetzer et al. | 429/199 |
| 4,729,931 | * 3/1988 | Grimble | 429/17 |
| 4,997,725 | 3/1991 | Pujare et al. . | |
| 5,298,340 | * 3/1994 | Cocks et al. | 429/13 |

FOREIGN PATENT DOCUMENTS

| | | |
|---|---|---|
| 1496178 | 10/1969 | (DE) . |
| 1596166 | 4/1971 | (DE) . |
| 2094035 | 2/1972 | (FR) . |
| 2236280 | 1/1975 | (FR) . |
| 1118151 | 6/1968 | (GB) . |
| 1119999 | 7/1968 | (GB) . |
| 1234014 | 6/1971 | (GB) . |
| 1277281 | 6/1972 | (GB) . |
| 1347534 | 2/1974 | (GB) . |

OTHER PUBLICATIONS

Fickett, "General Characteristics [of fuel cells]", Chapter 41 of "Handbook of Batteries and Fuel Cells", Linden, editor, McGraw Hill, publisher (no month), 1984.*

Linden, editior, "Handbook of Batteries, 2nd edition", McGraw–Hill, pp. 2.19–2.22. (no month), 1995.*

Nobuyoshi Nakagawa et al, Performance of an Internal Direct Oxidation Carbon Fuel . . . , Americal Chemical Society, pp. 1181–1185 (1988).

Leo Dubal, Recommended Practice for Solid Oxide Fuel Cell Products and Systems Evaluation, Swiss Federal Office of Energy, pp. 17–19, (1992) (no month).

\* cited by examiner

*Primary Examiner*—Carol Chaney
(74) *Attorney, Agent, or Firm*—Birch, Stewart, Kolasch & Birch, LLP

(57) ABSTRACT

There is disclosed a solid oxide fuel cell and a carbon direct-oxydizing-type electrode for the cell. The fuel cell comprises vanadium carbide which is used as the fuel electrode. The vanadium carbide and a carbon-series fuel are used in the fuel electrode.

13 Claims, 6 Drawing Sheets

F I G. 4
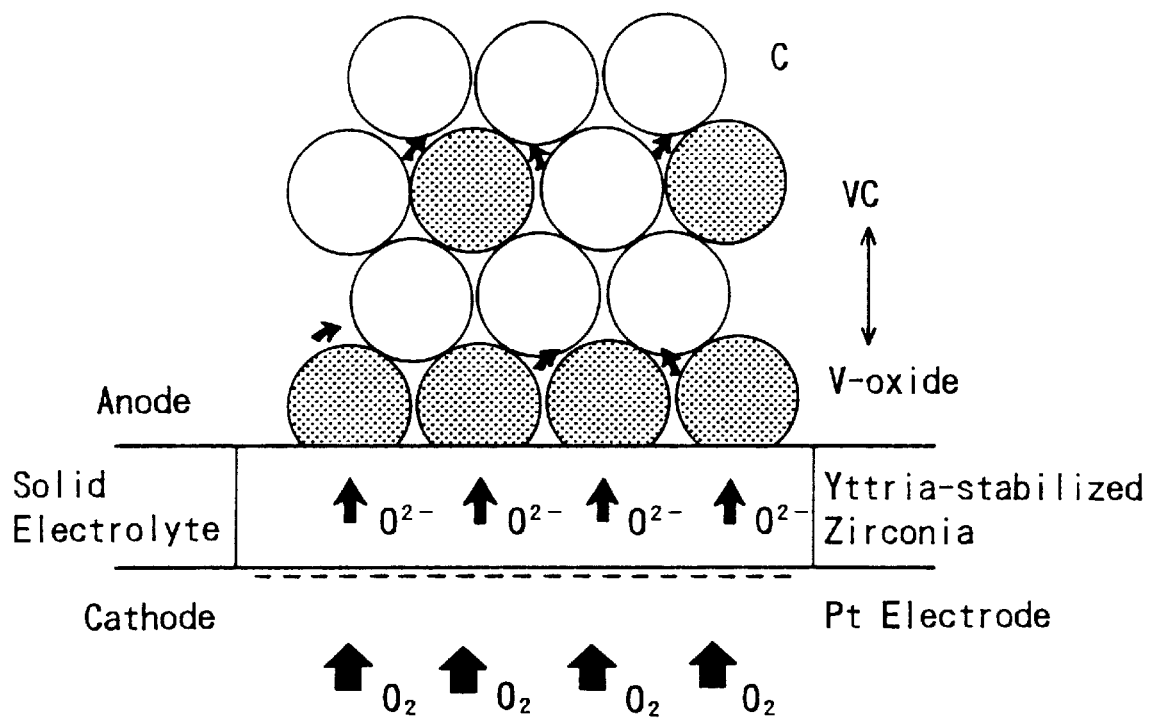

SOLID OXIDE FUEL CELL AND A CARBON DIRECT-OXIDIZING-TYPE ELECTRODE FOR THE FUEL CELL

This application is a continuation, of application Serial No. 08/535,728 filed on Sep. 28, 1995, now abandoned, which is a CIP of application Ser. No. 08/216,335 filed on Mar. 23, 1994, now abandoned.

This is a continuation-in-part application of U.S. patent application Ser. No. 08/216,335, filed on Mar. 23, 1994, the entire contents of which are hereby incorporated by reference.

FIELD OF THE INVENTION

The present invention relates to a solid oxide fuel cell (solid electrolyte-type fuel cell) wherein a carbon-series fuel, such as coal and charcoal, is partially oxidized without requiring any external gasifying process or an external fuel-reforming process, which produces free energy that can be converted to electrical energy. The present invention further relates to a fuel electrode that has a catalytic activity for directly oxidizing carbon-series fuels in solid oxide fuel cells.

BACKGROUND OF THE INVENTION

In a conventional fuel cell system, for example, of a phosphoric acid electrolyte-type, an alkali electrolyte-type, or a solid polymer electrolyte-type, natural gas, petroleum, or coal, which serves as a raw fuel, must first be gasified and reformed in an external gasifying-and-reforming reaction step by combining reforming reactions (I) and (II), which are endothermic reactions, with an exothermic reaction (III), and by converting all of the mixed gases of carbon monoxide and water by the shift reaction (IV).

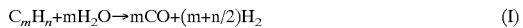
$$C_mH_n + mH_2O \rightarrow mCO + (m+n/2)H_2 \quad (I)$$

$$C_mH_n + mCO_2 \rightarrow 2mCO + n/2 H_2 \quad (II)$$

$$C_mH_n + m/2 O_2 \rightarrow mCO + n/2 H_2 \quad (III)$$

$$CO + H_2O \rightarrow H_2 + CO_2 \quad (IV)$$

In molten carbonate fuel cell systems and oxide fuel cell systems, which are high-temperature fuel cell systems, the shift reaction (IV) can be omitted. Nevertheless, in these fuel cell systems raw fuel is first converted to a mixed gas of hydrogen and carbon monoxide, by the reactions (I) to (III), which is then introduced into the fuel cell. Since in these conventional fuel cell systems, the step of gasifying and reforming the raw fuel and the fuel cell step are separate steps, the whole system is complicated. Therefore, there is a disadvantage in that the efficiency, for example, of heat recovery is low.

Further, when coal is used as a fuel, the operating conditions of the conventional coal gasifying-and-reforming step require a pressure and a temperature (above 1473 K) that are far higher than even those of solid oxide fuel cells, which operate at higher temperature than other types of fuel cells. Therefore, it is necessary that the coal gasifying-and-reforming step and the fuel cell step be separated into separate plants when making up a power-generation system. As a result, for example, it is not possible for the heat generated by solid oxide fuel cells to be recycled for effective utilization in the coal gasification process. Therefore, when coal is used as fuel, only a lower generation efficiency can be obtained in comparison with the use of natural gas.

Recently, a direct internal reforming method has been studied, wherein a separate gasifying-and-reforming reaction step is not required by incorporating the fuel gasifying-and-reforming step, which is an endothermic reaction, in the fuel cell stack in which an exothermic reaction takes place. This enables recovery of at least the heat loss that occurs with the reaction (III). In this direct internal reforming method, the activity of a conventional electrode, made up mainly of nickel, decreases significantly. In order to restrict this decrease in activity, it is necessary to add a large amount of water. However, because heat flows in and out with the evaporation and condensation of this added water, the efficiency of the whole system, including the efficiency of heat exchange, is considerably reduced.

Although natural gas has been studied with respect to the direct internal reforming method, hydrocarbon fuel, naphtha, and coal, which have higher molecular weights, have not yet been studied. This is because with the use of long-chain hydrocarbons, such as naphtha, in the direct internal reforming method, deposition of carbon is significant. As a result, a conventional nickel fuel electrode is "poisoned" and deactivated even if a large amount of steam is introduced. Therefore, since the carbon ratio of coal is even higher than that of naphtha, the direct internal reforming method using coal as a raw fuel has been considered impossible to pursue.

As discussed above, a coal gasifying apparatus and a fuel cell are combined into a complex system, which requires the use of a fuel cell into which coal can be directly introduced or a fuel cell that can be installed in a coal gasifying apparatus. Further, as a fuel electrode for such a fuel cell, a fuel electrode made of a new material is required. This material must not be "poisoned" or deactivated, like the above-mentioned nickel electrode, even when it comes in direct contact with coal. However, there are no conventional fuel electrodes that satisfy this requirement.

SUMMARY OF THE INVENTION

An object of the present invention is to provide a material for an electrode that will not be poisoned with carbon, and an electrode comprising that material.

Further, another object of the present invention is to provide a solid oxide fuel cell that is high in efficiency, wherein even a carbon-series fuel, such as coal, may be used. Conventionally, it is difficult to attain high efficiency of generation of electric power using solid state materials such as coal when such materials are subjected to a direct oxidation, i.e., combustion, reaction. Typically, a gasifying-and-reforming step is separately required to get an active fuel gas and electric power can be generated from the gasifying-and-reforming step itself.

Another object of the present invention is to provide a direct internal-reforming-type fuel cell wherein a small amount of steam may or may not be required.

Other and further objects, features, and advantages of the invention will appear more evident from the following description, taken in connection with the accompanying drawings.

BRIEF DESCRIPTION OF THE DRAWING

FIG. 4 is a conceptional diagram of the oxidation reaction at the interface between a vanadium carbide electrode and an yttria-stabilized zirconia electrolyte.

DETAILED DESCRIPTION OF THE INVENTION

The inventors have keenly studied various ways to attain the above objects and have found that vanadium carbide can be used as a material for a fuel electrode of solid oxide fuel cells that use a carbonaceous fuel, such as coal, without being poisoned and deactivated. Further, it has been found that when a solid oxide fuel cell having a vanadium carbide-containing fuel electrode is made into the shape of a cylinder, fuel in a solid form, such as coal powder, can be directly introduced, and a fuel gasification/reformation-fuel cell complex reaction system is obtained, wherein the partial oxidation reaction of the gasifying step generates power. The present invention has been based on these findings.

That is, the present invention provides:
(1) A solid oxide fuel cell containing a fuel electrode which comprises vanadium carbide;
(2) The fuel cell as stated in above (1), wherein vanadium carbide and a carbon-series fuel are used in the fuel electrode;
(3) The fuel cell as stated in above (2), wherein natural gas or naphtha is reformed;
(4) The fuel cell as stated in above (2), wherein the carbon-series fuel is coal and the partial oxidation reaction of the gasification reaction of the coal generates power; and
(5) A fuel electrode for a solid oxide fuel cell, which comprises vanadium carbide.

Now the present invention will be described in detail.

In the present invention, the term "carbon-series fuel" refers to a carbon fuel, such as graphite and charcoal, as well as to the usual hydrocarbon fuel, such as coal, natural gas, and naphtha. Further, the term "reforming" refers to a catalytic reaction that converts high molecular weight hydrocarbons to useful low molecular weight hydrocarbons. For example, naphtha, which is a mixture of low-boiling hydrocarbons that is obtained by distilling petroleum, coal tar, or the like, may be converted to methane, ethylene, ethane or the like, which may be further converted to CO and $H_2$.

In the present invention, zirconia is preferable and yttria-stabilized zirconia is more preferable as the solid electrolyte of the solid oxide fuel cell.

Figure 1:
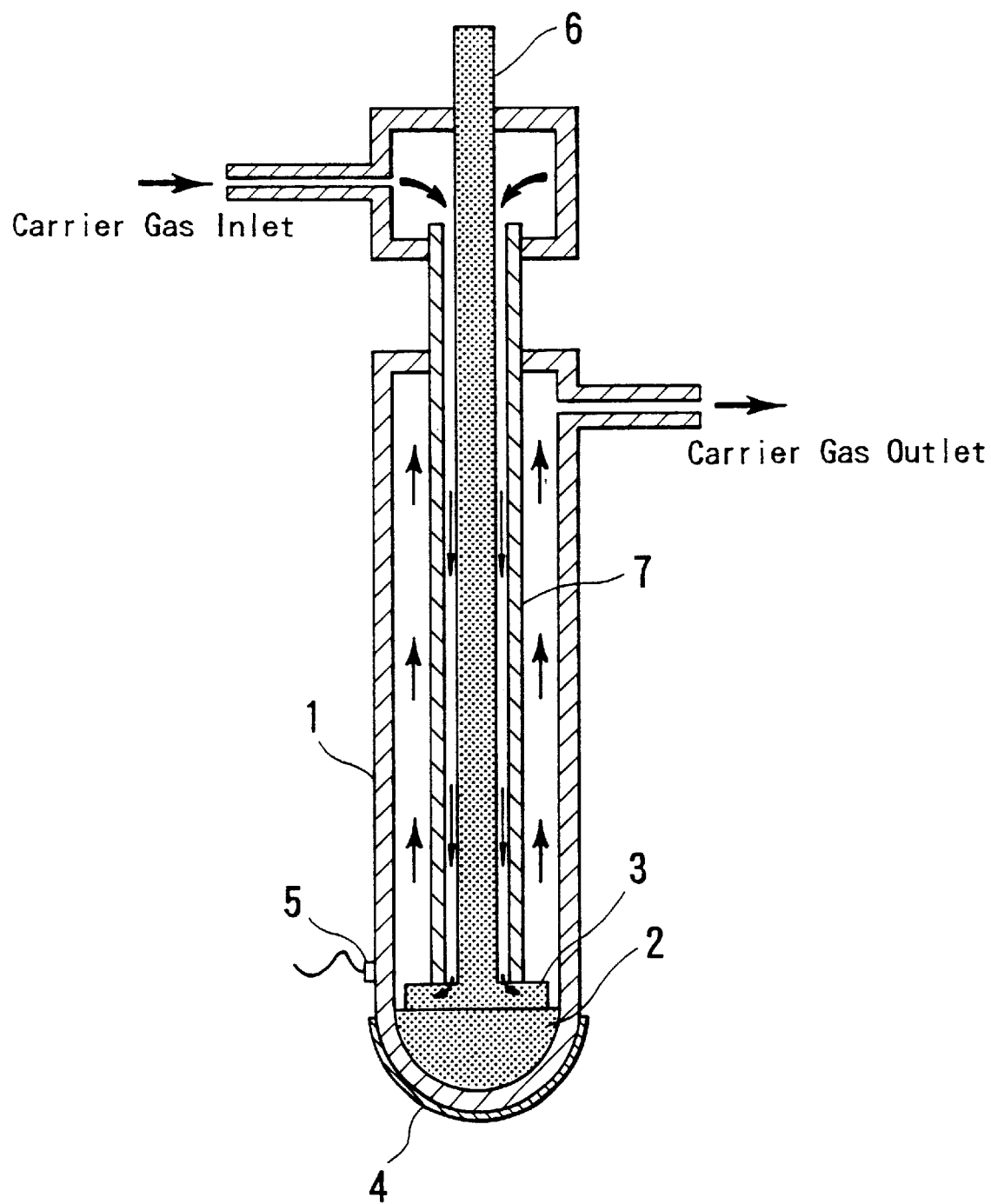
FIG. 1 is a cross section showing an embodiment of the solid oxide fuel cell of the present invention.
Figure 2:
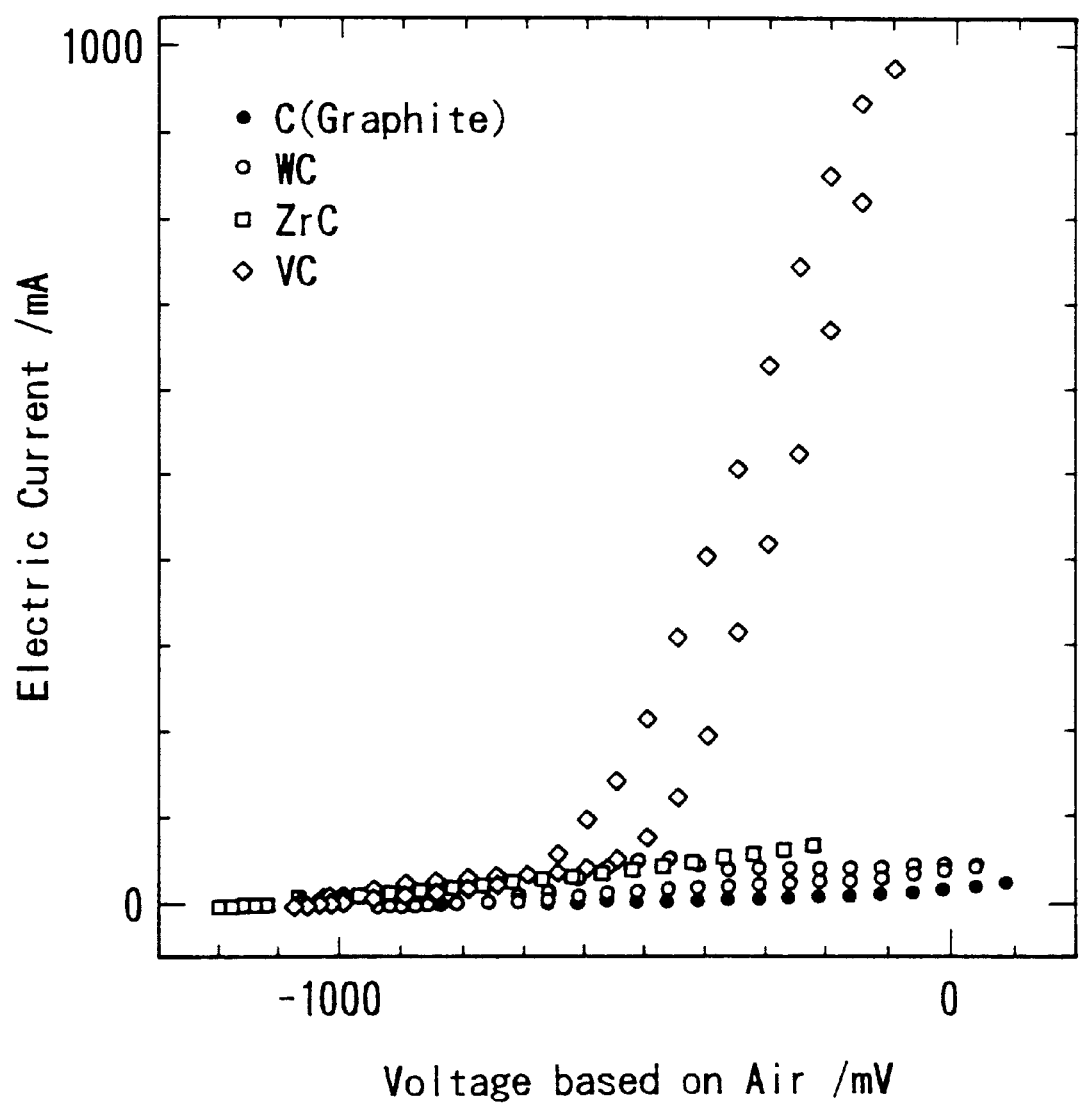
FIG. 2 is the electric current-voltage characteristic curves obtained when the solid oxide fuel cell, which used different carbides as a carbon direct-oxidation electrode, was anodically polarized (to the direction of oxidation).

The embodiments of the present invention are described with reference to the drawings:

FIG. 1 is a cross section of a carbon direct-oxidation solid oxide fuel cell according to the present invention; and FIG. 2 shows the results of measurement of activity of various electrodes in the fuel cell of FIG. 1. In FIG. 1, reference numeral 1 indicates a tube of yttria-stabilized zirconia, 2 indicates a fuel electrode made of a mixture of a graphite powder and tungsten carbide, zirconium carbide or vanadium carbide, 3 indicates a graphite pellet for pressing the mixture 2, 4 indicates an air electrode coated with platinum (counter electrode), 5 indicates a reference electrode, 6 indicates a rod made of graphite, 7 indicates an alumina tube, and 8 and 9 are an inlet and outlet of a carrier gas, respectively.

The function of reference electrode 5 is for measuring DC polarization of an anode and AC impedance of an anode/electrolyte interface. Since the reference electrode should not be affected by the change of oxygen potential during measurement, the reference electrode is positioned on the side wall of the yttria-stabilized zirconia tube. In the fuel cell shown in FIG. 1, the graphite rod 6 from the fuel electrode 2, and counter electrode 4 are connected to make a circuit in which a potentiostat (not shown) is connected. The reference electrode 5 in FIG. 1 is connected to the potentiostat. The measured value of the terminal voltage between 6 and 4 differs from the measured value between 6 and 5. However, the difference between the above two values is also a result of the electrolyte thickness and cathode activities. Reference electrode 5 is used as reference potential to the measured electrode potential, because the electrode potential is a relative value. Further, the function of the reference electrode is well known in the art of cells.

As shown in FIG. 1, the graphite powder mixture having tungsten carbide (WC), zirconium carbide (ZrC), or vanadium carbide (VC) 2 was placed in the tube 1 and electric current was collected with the rod 6. According to this fuel cell, oxygen is converted into oxide ions on the air electrode side; these ions diffuse into the zirconia; and react on the fuel electrode side, to oxidize the graphite. That is, the following reactions (V) and (VI) proceed on the air electrode side and the fuel electrode side, respectively, when graphite is used as the fuel, and a part of free energy is generated as electricity. The generation of the carbon monoxide (CO) was measured by gas chromatography.

$$\text{cathode: } O_2 + 4e^- \rightarrow 2O^{2-} \tag{V}$$

$$\text{anode: } 2O^{2-} + 2C \rightarrow 2CO + 4e^- \tag{VI}$$

In FIG. 2, the abscissa axis represents the electric potential using air as a reference and the ordinate axis represents the electric current obtained from the cell. These results show that the larger the obtained electric current, the higher the generation efficiency. From FIG. 2, it is clear that electric current can be obtained from almost all compounds used in the mixture. However, when vanadium carbide is used in the mixture used in the fuel electrode, the electric current is remarkably larger than in the case with other compounds, thereby indicating that a higher generating efficiency can be obtained by using vanadium carbide in the fuel electrode.

In the present invention, the description "vanadium carbide is used as a fuel electrode" means that vanadium carbide is contained together with a carbon-series fuel. Although there are no particular restrictions on the mixing ratio of vanadium carbide and the carbon-series fuel, the larger the amount of vanadium carbide, the more favorable. The amount of vanadium carbide is generally 40 wt % or more, preferably 50 wt % or more, and particularly preferably 80 wt % or more, based on the total amount of the vanadium carbide and the carbon-series fuel.

In another embodiment of the present invention, the fuel electrode and the air electrode shown in FIG. 1 are placed outside and inside, reversing the structure of FIG. 1. For example, a yttria-stabilized zirconia tube serves as the solid electrolyte, and on its inner wall is provided an electrode of platinum, silver, perovskite, or the like as the air electrode. Air or concentrated oxygen is fed to the air electrode side, and a mixture of vanadium carbide powder dispersed in coal powder is used as the material for the fuel electrode and is provided outside the zirconia tube, thereby constituting a carbon direct-oxidation fuel cell. In this case, the oxygen fed inside the tube is converted into oxide ions; these oxide ions pass through the zirconia tube, to oxidize the coal powder positioned outside the zirconia tube, and the free energy of the oxidation reaction is generated as electricity.

Further, such single fuel cells may be connected in series or in parallel through an electrical connecting material or interconnection, to form a bundle of cells. The bundle may be placed in a container, and if air is supplied to the inside of the tube and coal powder is supplied to the outside, a coal gasifying apparatus-fuel cell can be made.

Figure 3:
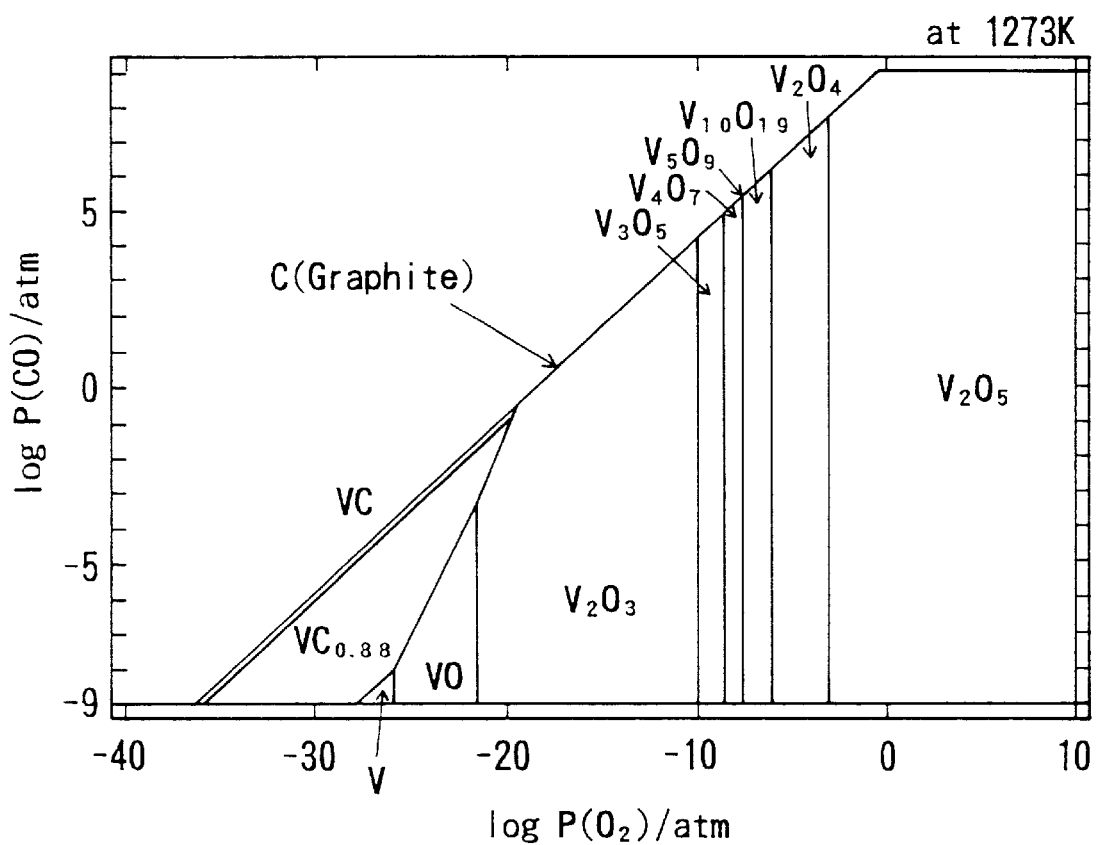
FIG. 3 is the phase equilibrium chart of the V-C-O type at 1273 K, wherein the logarithm of the oxygen partial pressure is plotted along the abscissa axis and the logarithm of the carbon monoxide partial pressure is plotted along the ordinate axis.

A thermodynamic analysis was carried out to elucidate the reaction of vanadium carbide in the-fuel electrode. Specifically, the existent oxide forms of the vanadium carbide were estimated from a thermodynamic equilibrium calculation. FIG. 3 shows the phase equilibrium chart of the V-C-O system at 1,000° C., wherein the abscissa axis represents the logarithm of the oxygen partial pressure and the ordinate axis represents the logarithm of the carbon monoxide. According to this phase equilibrium chart, oxide phases, such as $V_2O_3$, $V_3O_5$, $V_4O_7$, $V_5O_9$, $V_{10}O_{19}$, and $V_2O_4$, appear successively from an oxygen partial pressure of about $10^{-10}$ atm toward the higher oxygen partial pressure side. Therefore, based on the equilibrium calculation, it is believed that the oxide ions that pass through the zirconia probably oxidize vanadium carbide rather than carbon in the carbon-series fuel.

It is believed that the oxidized vanadium carbide is converted to the vanadium oxide ($VO_x$), whereby instead of the reaction (VI), the reaction (VII) proceeds. It is further believed that the produced vanadium oxide is reduced with the coexistent carbon in the carbon-series fuel by the reaction (VIII), to vanadium carbide.

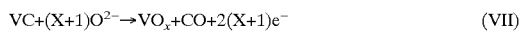

$$VC+(X+1)O^{2-} \rightarrow VO_x+CO+2(X+1)e^- \qquad (VII)$$

$$VO_x+(X+1)C \rightarrow VC+XCO \qquad (VIII)$$

A conceptual diagram is shown in FIG. 4, wherein the vanadium carbide is believed to react with the oxide ions that pass through the zirconia solid electrolyte, to become vanadium oxide, which is further believed to supply oxygen to the carbon of the fuel, to promote the oxidation reaction at the fuel electrode side. After the vanadium oxide supplies oxygen, the vanadium oxide is believed to become vanadium carbide again.

In FIG. 4, the shaded circles represent both vanadium oxide and vanadium carbide. At the interface region of the anode/yttria-stabilized zirconia electrolyte, vanadium carbide tends to be oxidized to vanadium oxide. By contacting graphite and exposing carbon monoxide (CO) gas, the vanadium oxide is reduced to vanadium carbide. This redox reaction of vanadium oxide-vanadium carbide is schematically shown in FIG. 4.

A conventional electrode, such as nickel, promotes oxidation of the fuel without being changed by the oxidation and reduction reactions. In other words, a nickel electrode allows electrical charges to move through the electrode, thereby collecting electricity. However, in the vanadium carbide fuel electrode of the present invention, the oxidation of fuel is believed to be carried out in conjunction with the oxidation and reduction of the vanadium carbide.

Thus, since the vanadium carbide itself is recycled by reacting with oxygen and carbon in an oxidation and reduction reaction the vanadium carbide, unlike the conventional nickel electrode, is not poisoned and deactivated when it comes in contact with carbon.

A further embodiment of the present fuel cell utilizes coal as the carbon-system fuel. By using a mixture of vanadium carbide and coal powder in the fuel electrode, and supplying air to the air electrode, a fuel cell is obtained that involves reactions (IX) and (X), as well as the reactions (VII) and (VIII).

$$C_mH_n+mO^{2-} \rightarrow mCO+n/2H_2+2me^- \qquad (IX)$$

$$m/2O_2+2me^- \rightarrow mO^{2-} \qquad (X)$$

The electrode reaction in the fuel cell of the present invention comprises reforming reaction or gasification reaction to generate fuel gases, i.e., CO and $H_2$, by the reaction (IX). In addition, the fuel cell generates the electricity by the reaction (IX). There are charge transfer and electron transfer between anode and cathode of the fuel cell of the present invention in the partial oxidation to generate CO with electricity.

Further, the exhaust heat (at around 578 t 873 K) may be used to drive a steam turbine at the end of the electric power plant containing the fuel cell of the present invention.

The reason the reaction (XI) does not follow the reaction (X) is considered to be because, even if carbon monoxide is oxidized to carbon dioxide by the reaction (XI), the reaction (XII) occurs due to the excess presence of carbon, and the carbon dioxide is reduced to carbon monoxide.

$$CO+O^{2-} \rightarrow CO_2+2e^- \qquad (XI)$$

$$CO_2+C \rightarrow 2CO \qquad (XII)$$

Accordingly, in the fuel cell of the present invention, reaction (IX) and (X) represent fuel cell reactions when coal or a hydrocarbon is used as the fuel. Reaction (III), which represents a coal gasifying reaction for conventional fuel cells, and the overall reaction of reactions (IX) and (X) differ with respect to the oxygen source, wherein reaction (III) utilizes gaseous state oxygen, while reaction (IX) utilizes oxide ions passing through the yttria-stabilized zirconia electrolyte. Since oxide ions are used as the oxygen source in the fuel cell of the present invention, electricity can be generated by reaction (IX).

The chemical by-products of the reactions occurring at this fuel cell are coal gas, such as CO and $H_2$, and heat for partial oxidation. In the fuel cell of the present invention, the partial oxidation reaction, which is the coal gasifying reaction to generate coal gas, is a fuel cell reaction to generate electricity. Therefore, it can be said that the fuel cell of the present invention is a coal gasifying apparatus that also functions as a fuel cell.

Further, if, instead of the coal powder-vanadium carbide powder fuel electrode, only vanadium carbide is used in the fuel electrode and a gaseous fuel, such as natural gas, is directly introduced into the apparatus, it is apparent that a fuel cell represented by the reactions (IX) and (X) can be obtained. Even if a large amount of steam is not supplied in such a fuel cell, the performance of the vanadium carbide electrode is not deteriorated. Therefore direct reforming is possible without the introduction of steam.

According to the solid oxide fuel cell of the present invention, electric power can be generated even from the gasifying step of a carbon-series fuel and therefore the efficiency of power generation can be elevated considerably over conventional fuel cells. Further, a carbon-series fuel, such as coal, charcoal, and natural gas, can be directly oxidized and reformed without external gasifying.

The electrode containing vanadium carbide of the present invention exhibits satisfactory catalytic activity in a solid oxide fuel cell, wherein carbon can be directly oxidized and combusted, and the electrode can remarkably increase generation power of the cell. Further, the electrode can not only increase the current, it can also be used in a fuel cell in which a carbon-series fuel can be directly oxidized without a reforming step, to thereby remarkably increase the power-generation characteristics.

The present invention will now be described in detail with reference to the following examples. However, the invention is not limited to the examples.

Example 1

A fuel cell was made up in accordance with FIG. 1. In this cell, for the solid electrolyte, zirconia stabilized with 8 mol % of $Y_2O_3$ (yttria) was used. A mixed powder (2) made up of about 3 g of vanadium carbide and about 3 g of graphite was placed in the zirconia tube 1 (length: about 300 mm, diameter: 21 mm, thickness: about 2 mm), one end of which was closed, and the powder 2 was pressed by a graphite pellet 3. The lower outer surface of the closed end of the zirconia tube 1 was coated with a platinum paste, to prepare a counter electrode (cathode) 4. The reference electrode 5 was a platinum wire wound around the side wall surface of the zirconia tube, and air was used as standard. The working electrode (anode) was the vanadium carbide-graphite mixture 2 placed in the zirconia tube, and the electrode area was about 3 cm². Since the platinum wire is not resistant to carbon, a graphite rod 6 was used to conduct/collect an electric current from the working electrode. During the elevation of the temperature of the fuel cell and during the electrochemical measurement, Ar (argon) was flowed at a rate of about 60 ml/min, as a carrier gas to blow off the gas produced inside the fuel cell. Reference number 7 indicates an alumina tube for protecting the graphite rod.

Further, for comparison, a fuel cell was formed in which the composition of the fuel electrode was changed.

Figure 5:
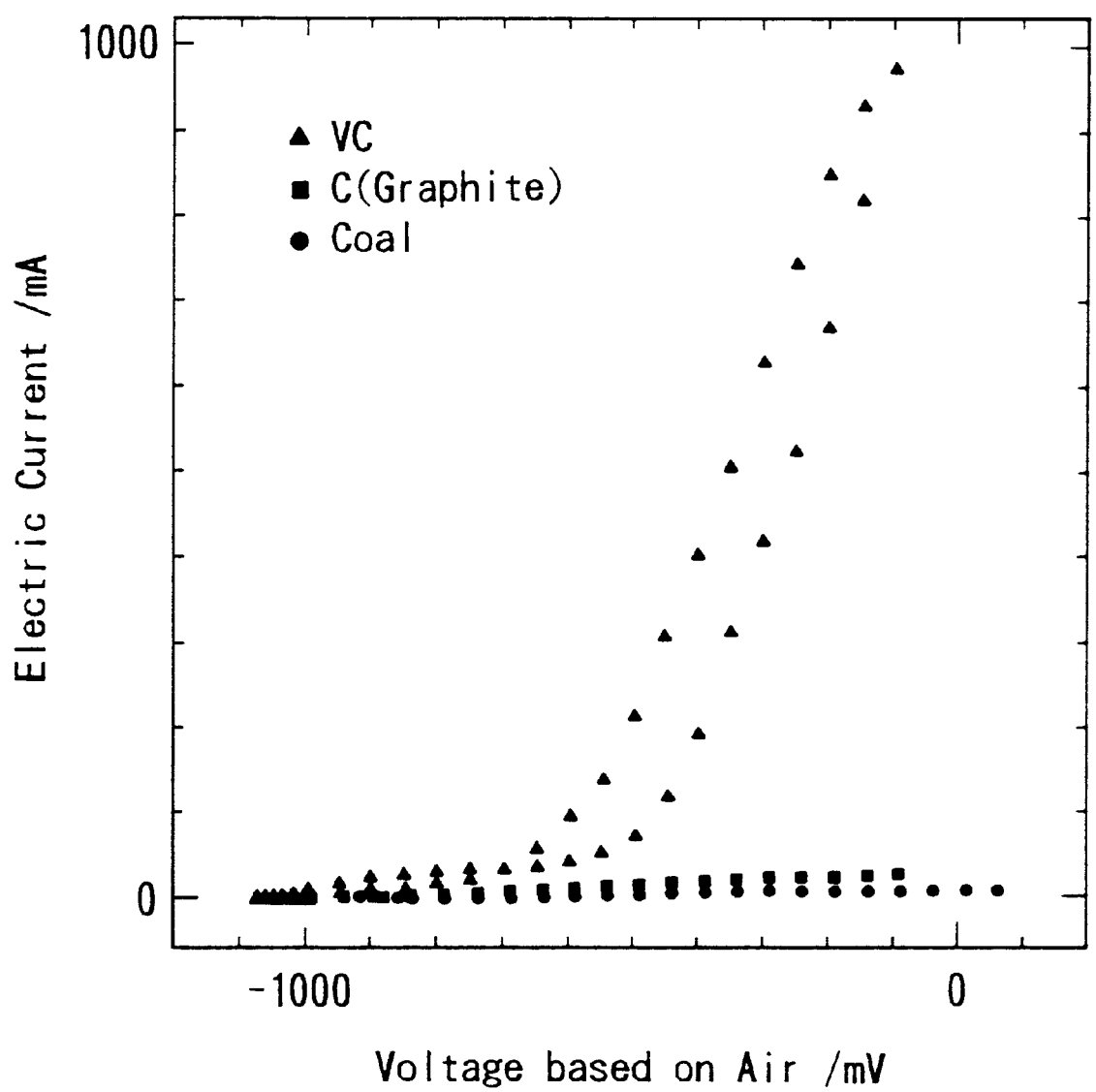
FIG. 5 is the electric current-voltage characteristic curves obtained when the solid oxide fuel cell which used (i) a combination of vanadium and graphite (VC), (ii) only graphite (c), and (iii) only Taiheiyo coal (name of Japanese domestic coal), as a carbon direct oxidation electrode was polarized anodically.

The current-voltage characteristics of the above fuel cells measured under the above conditions (1273 K) are shown in FIGS. 2 and 5. FIG. 2 shows the results of measurement of cells in which the vanadium carbide in the mixed powder 2 was changed to other carbides, or only graphite, together with the results of measurement of the cells of the present invention. FIG. 5 shows the results of tests of cells in which, instead of the above mixed powder 2 of vanadium carbide and graphite, only graphite powder or only Taiheiyo coal (Japanese domestic coal) was used. In the measurement of the current generated by the cells, a potentiostat (a constant potential-controlling apparatus) was used to keep the electric potential constant for 30 sec, and the generated electric currents were measured at a constant electric potential and plotted.

As apparent from FIG. 2, when a carbide powder was mixed with graphite for use in the fuel electrode, higher electric currents were measured, in comparison to when graphite alone was used. Among the various carbide electrodes, the vanadium carbide electrode in particular showed a higher electric current. Further, a sharp increase in electric current was observed from the anodically polarized point of about 500 mV (in the direction of oxidation). The maximum electric current that was generated in this fuel cell was about 1000 mA. Therefore, it is apparent that when vanadium carbide was used, a remarkable increase in electric current occurred and the efficiency of the power generation was high. From FIG. 5 it is clear that a high electric current may be attained when vanadium carbide was used in combination with graphite (VC).

Example 2

Figure 6:
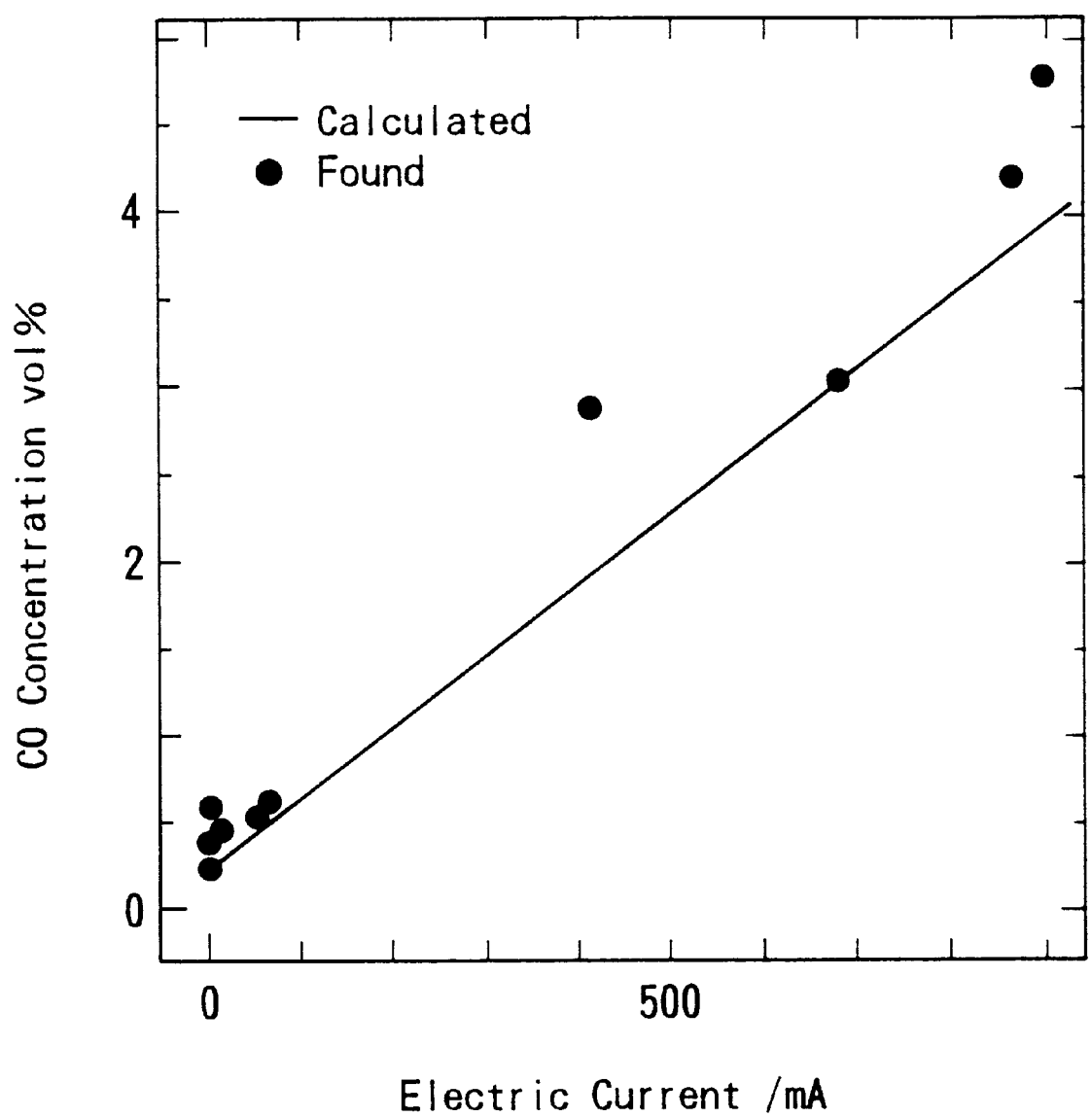
FIG. 6 is a graph showing the relationship between the concentration of the discharged carbon monoxide and the generated electric current in a solid oxide fuel cell that used a vanadium carbide electrode.

With respect to the fuel cell prepared in Example 1, which had a mixture of vanadium carbide powder and graphite powder, the gas discharged from the cell was analyzed by gas chromatography and was compared with the electric current-voltage curve. The relationship between the volume fraction of CO (carbon monoxide) contained in the discharged gas and the output electric current is shown in FIG. 6. Due to the structure of the cell, when $CO_2$ was produced at the electrode/electrolyte interface, the reaction (XII), $CO_2+C \rightarrow 2CO$, occurred during the passage of the $CO_2$ through the carbon fuel, and only CO was detected.

However, the total amount (current) of electrical energy produced by the oxidation combustion of the carbon did not change even if the reaction (XII) occurred. Therefore, the current to be obtained from the produced amount of Co was calculated and plotted in FIG. 6. From this, it can be understood that there is a rough mutual relationship between the measured values and the calculated values. Therefore, it can be understood that the output electric current of the fuel cell of the present invention is due to the oxidation and combustion of carbon.

Example 3

A cell was prepared in the same manner as Example 1, except that a mixed powder of about 3 g of vanadium carbide and about 3 g of Taiheiyo coal (Japanese domestic coal) was used in the fuel electrode. As a carrier gas, Ar (argon) was passed through the cell at a rate of about 60 ml/min; the electrical potential was kept constant by a potentiostat at 1273 K for a period of 30 sec in the same manner as Example 1. When the generated electric current was measured at that electric potential, a maximum electric current of 900 mA was obtained. At an electric potential of about −100 mV (an anodically polarized electric potential of about 900 mV) for air, an electric current of about 800 mA was obtained. The electric current-voltage curve was approximately a straight line.

Having described our invention as related to the present embodiments, it is our intention that the invention not be limited by any of the details of the description, unless otherwise specified, but rather be construed broadly within its spirit and scope as set out in the accompanying claims.

What we claim is:

1. A fuel cell comprising a solid oxide electrolyte and characterized by an electrode which consists essentially of vanadium carbide and a carbon-series fuel; the electrode further characterized by half cell reaction $$O^{-2}+C \rightarrow CO+2e^-$$

occurring at the electrode.

2. The fuel cell as claimed in claim 1, wherein natural gas or naphtha is reformed.

3. The fuel cell as claimed in claim 1, wherein the carbon-series fuel is coal and a partial oxidation reaction and gasification reaction of the coal serve as a power-generation reaction of the fuel cell.

4. The fuel cell as claimed in claim 1, wherein a yttria stabilized zirconia compound is used as a solid electrolyte of the fuel cell.

5. The fuel cell as claimed in claim 1, wherein the amount of vanadium carbide is 40 weight percent or more based on the total amount of vanadium carbide and the carbon-series fuel.

6. The fuel cell as claimed in claim 1, wherein the amount of vanadium carbide is 80 weight percent or more based on the total amount of vanadium carbide and the carbon-series fuel.

7. The fuel cell of claim 1, wherein the carbon-series fuel is graphite or coal.

8. A method of producing electric power comprising gasifying and reforming a carbon-series fuel with a fuel cell of claim 1.

9. A fuel cell comprising a solid oxide electrolyte and characterized by an electrode which comprises vanadium carbide and a carbon-series fuel; the electrode further characterized by half cell reaction $$O^{-2}+C \rightarrow CO+2e^-$$

occurring at the electrode.

10. The fuel cell as claimed in claim 9, wherein a yttria stabilized zirconia compound is used as the solid electrolyte of the fuel cell.

11. The fuel cell according to claim 1, wherein said fuel cell produces electric power by gasifying and reforming a carbon series fuel.

12. The fuel cell according to claim 9, wherein said fuel cell produces electric power by gasifying and reforming a carbon series fuel.

13. The fuel cell of claim 12 wherein the carbon-series fuel is graphite or coal.

* * * * *